June 5, 1956  H. C. SCHIFFER  2,748,759
AUTOMATIC STARTING DEVICE
Filed Nov. 23, 1953  2 Sheets-Sheet 1

INVENTOR
HENRY C. SCHIFFER

BY Ralph E. Bitner.

ATTORNEY

June 5, 1956  H. C. SCHIFFER  2,748,759
AUTOMATIC STARTING DEVICE
Filed Nov. 23, 1953  2 Sheets-Sheet 2

INVENTOR
HENRY C. SCHIFFER
BY Ralph E. Bitner
ATTORNEY

United States Patent Office 2,748,759
Patented June 5, 1956

2,748,759

AUTOMATIC STARTING DEVICE

Henry C. Schiffer, Meriden, Conn.

Application November 23, 1953, Serial No. 393,739

5 Claims. (Cl. 123—179)

This invention relates to an automatic device for starting internal combustion engines. It has particular reference to an arrangement which can be pre-set by the operator of an automobile to start the engine at any predetermined time interval.

The combustion engines used in modern type automobiles operate efficiently only after they have been heated to an optimum temperature which is generally in the neighborhood of 180 degrees. For this reason the starting of cars in cold weather is generally a difficult and time consuming operation and much time is wasted by the operator in bringing the car engine from a low temperature to a much higher temperature so that the car can be made to operate efficiently. The present device is pre-set by a timing mechanism and starts the car at a speed which is somewhat above the idling speed. After a short time interval the speed is automatically reduced to the correct idling speed and the motor continues to run until the proper temperature has been reached. This operation is effected without the presence of the driver and the device may be set for a time which is 15 minutes before the contemplated use of the vehicle, early in the morning, or at a time when the driver is scheduled to stop work or leave an appointment. Numerous safety devices and safety circuits are employed to prevent excessive battery use in case the fuel is exhausted or in case the controls have not been properly set.

One of the objects of this invention is to provide an improved starting arrangement for an automobile which avoids one or more of the disadvantages and limitations of prior art arrangements.

Another object of the invention is to provide a comfortable, warm car during cold weather when the operator is ready to use the car.

Another object of the invention is to defrost the windshield of ice, sleet, and snow so that the car is safe to drive at the end of the starting period.

Another object of the invention is to heat the engine at idling speed so that it may operate at higher speeds without the excessive wear generally encountered in a cold engine.

Another object of the invention is to provide an alarm to awaken drivers who wish to sleep in their cars by turning on a power radio set at a predetermined time.

Another object of the invention is to provide a simplified engine starting device which can be attached to a modern automobile without interfering with the usual operation.

Another object of the invention is to reduce the cost of car starting devices by providing a simplified arrangement of circuit components.

The invention comprises a timing means which may be an alarm clock and four cam surfaces operated by the timing mechanism for controlling switches in an auxiliary circuit which can be attached to the automobile wiring system. One of these cams closes the circuit which connects the starter motor to the battery supply. Another cam closes a switch which operates the ignition system. A third cam operates the throttle to reduce the speed from a starting speed to an idling speed a short time interval after the engine has been started. A fourth cam turns off the entire system after a fifteen minute time interval.

For a better understanding of the present invention, together with other and further objects thereof, reference is made to the following description taken in connection with the accompanying drawings.

Figure 1:
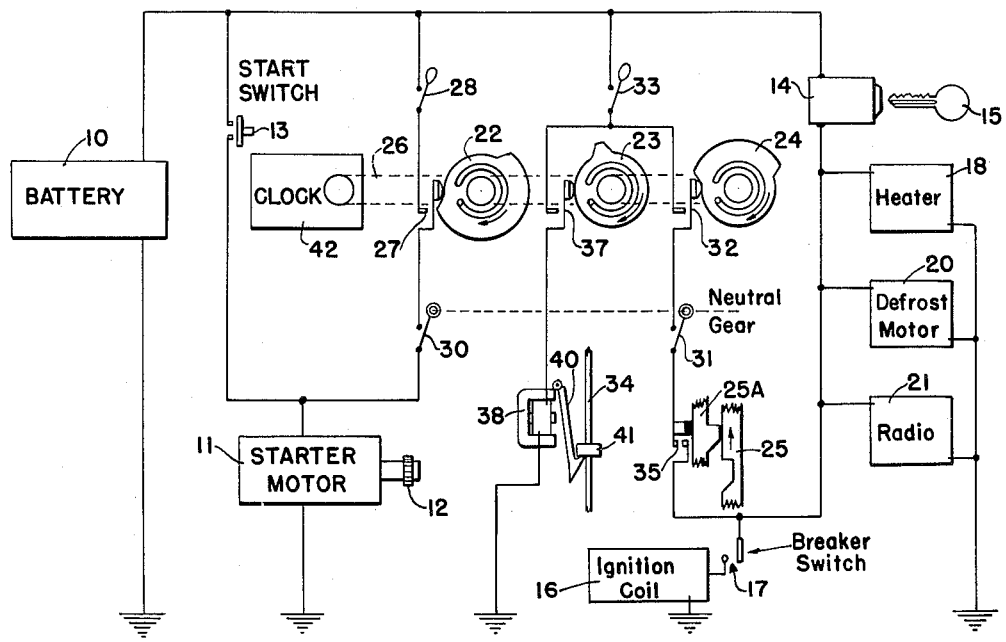
Fig. 1 is a schematic diagram of connections showing the starter circuit connected to the circuit in the automobile.

Referring now to Fig. 1 the circuit includes a battery 10 which is employed to start the engine and otherwise furnish electrical power for the operation of the automobile. A starter motor 11 is connected in the usual manner by a pinion gear 12 which automatically meshes with a gear on the engine fly wheel (not shown). A start switch 13 is employed to apply battery power to the starter motor when starting the engine in the usual manner. An ignition switch 14, operated by a key 15 is shown to illustrate the usual operation of the automobile when the operator is present. The ignition switch applies battery power from battery 10 to an ignition coil 16 which contains an automatic breaker switch 17 run by the engine. This circuit also shows a heater 18 for heating the interior of the automobile, a defrosting mechanism 20 which includes a motor and defrosting heater, and a radio set 21. The method of connection of these components differs with different makes of automobiles but it is contemplated that if the car manufacturer has connected these items in a manner different to that shown in the diagram connection will be changed so that the final diagram will be equivalent to the circuit shown in Fig. 1.

The automatic starting of the engine is accomplished by four cams, 22, 23, 24, and 25, each of which operates a switch to change the circuit and provide automatic operation of the automobile engine.

Cam 22 is secured to a shaft 26 operated by the clock mechanism 42 and closes a contact 27 which applies power from battery 10 to the starter motor when switch 28 has been closed and when the gear shift arrangement is in neutral, thereby closing switches 30 and 31 and rotating the armature of the starter motor to turn the engine over and to start it.

Cam 24 is arranged to close contacts 32 which apply battery power to the ignition system 16, 17 when switches 33 and 31 are closed. This operation energizes the spark plugs and causes the motor to start coincident with the rotary motion of the engine as supplied by the starter motor 11. It should be noted that during this starting operation the start switch 13 remains open and the ignition switch 14 also remains in its unoperated condition, bypassed by switches 35, 28, 33, 30, and 31.

During the preliminary phases of the starting operation the throttle is set at an intermediate fuel supply setting controlled by rod 34. This setting is adjusted to supply an amount of fuel which will provide easy and reliable starting action. After the initial starting period which will last for about 4 to 6 seconds the throttle is again adjusted so that the fuel supply is sufficient for an idling speed. It has been found by experiment that the operation of an internal combustion engine at idling speed is the most efficient and reliable means for raising the motor block of an internal combustion engine to its operating temperature.

During the starting period cam 25 is slowly turning and holding contacts 35 in operating engagement, thereby energizing the ignition system. Cam 25 is operated by a slow-turning gear 50 (see Fig. 2) in the timing mechanism which turns much slower than the shaft which operates cams 22, 23, and 24. Cam 25 is arranged to turn at such speed so that contacts 35 will be broken about 15 minutes after the starting operation has commenced. This precaution has been built into the starting arrangement in order to take care of the situation which may arise when the motor fails to start due to dirty spark plugs, worn-out battery, or other defects in the mechanism not generally present in modern well kept automobile engines.

The throttle rod 34 is generally set in a position so that the engine will be started at a speed which is about 50 percent greater than the idling speed. This speed has been found to be the best speed for engine starting particularly during very cold weather. After the engine has been started the motor speed should be reduced to the correct idling speed so as to conserve fuel and not to over-heat the engine. This is accomplished by cam 23 which makes contact with a cam operated switch 37 which energizes a magnet 38, moving a magnet armature 40 away from a disc 41 which is secured to the shaft 34 thereby permitting shaft 34 to move a small distance and close the throttle to the correct idling speed. It has been found by experiment that the proper time for changing the throttle is about 7 seconds after the initial starting operation but it is understood that this time can be changed easily by altering the position of cam 23 on shaft 26 and it is further understood that such timing may be changed to accommodate different motors and different motor conditions.

The successful operation of this automatic device includes the following operating schedule. First, the operator winds the time spring (not shown) and spring 43 (Fig. 2) which is similar to an alarm spring in the usual form of alarm clock. This spring is wound by turning a knob 44 which is coupled to the spring by a ratchet mechanism 51. Second, the time of starting is set by adjusting knob 52. This knob controls a pointer 53 on a 24 hour dial 54. Turning knob 52 also adjusts a cam follower 25A so that it will fall into a cam slot on cam 25 at the desired starting time. Third, the operator places the gear lever in neutral so that switches 30 and 31 are closed and closes switches 28 and 33.

The automatic device is now set for operation and the operator leaves the automobile with switch 14 open, removing key 15. If it is desired to turn on the car heater, defroster, or radio when the car starts, the switch controls for these components are turned to the "on" position. The throttle control knob is pulled out all the way and then pushed back, setting disc 41 above the catch on armature 40.

Figure 6:
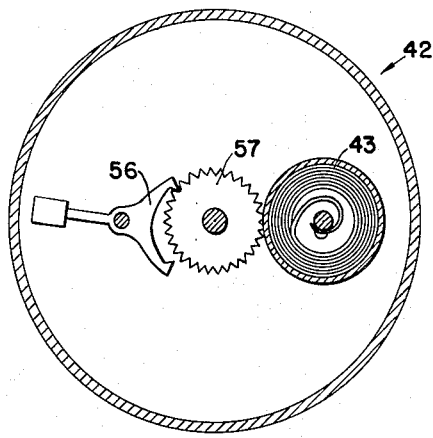
Fig. 6 is a cross sectional drawing of the timing mechanism taken along line 6—6 of Fig. 2.

When the car starting device is adjusted as described above the car engine will be started automatically at the desired time. First cam follower 25A (Fig. 2) moves into cam slot 25 and contacts 35 are closed. At this time a friction pad 55 is lifted from an inertia escapement pawl 56 (see also Fig. 6) and the pawl starts to vibrate permitting escapement wheel 57 to turn at a predetermined speed. Power for the rotary motion is furnished by spring 43 acting through gears 58 and 60. Gear 60 turns the top plate of a friction clutch 61 which is resiliently held in engagement by a spring 62, the result being the rotation of shaft 26 and cams 22, 23, and 24. Shaft 26 is resiliently stressed by spiral spring 45 to return to its normal position but the driving action of gear 60 acting through clutch 61 overcomes this spring and the cams are turned almost a full revolution.

Figure 2:
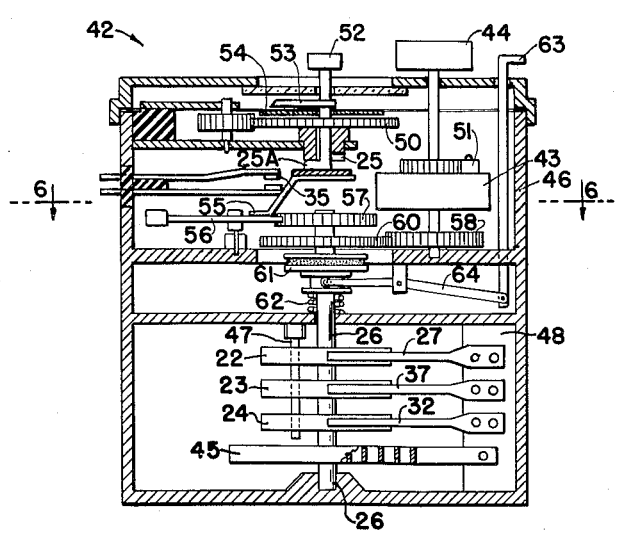
Fig. 2 is a side view of the timing mechanism and the cam operated switches. Some of the parts are shown in section.
Figure 3:
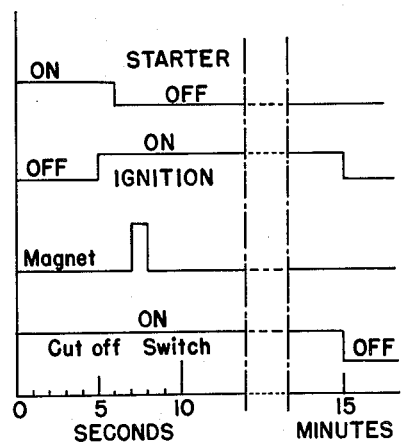
Fig. 3 is a graph showing the timing of the four cams.
Figure 4:
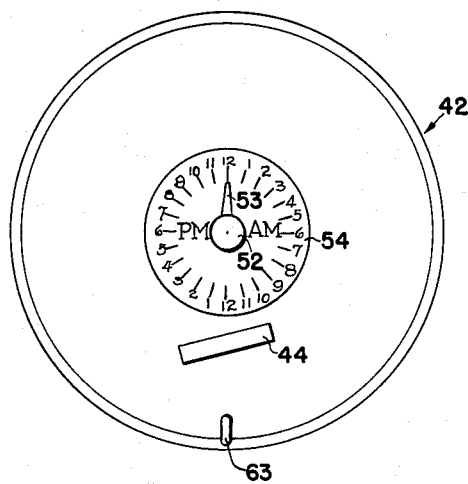
Fig. 4 is a top view of the timing mechanism showing the time set control knob.

The operation of the device during the first 10 seconds can be best understood by referring to the timing diagram of Fig. 3. First the starter motor is connected by the closure of contacts 27 (by cam 22). The starter motor turns the engine over for five seconds and then the ignition is turned on by cam 24. This action starts the motor and it runs for two or three seconds at a speed which is about 50 percent more than idling speed. At seven seconds after the starting operation cam 23 closes contacts 37 and magnet 38 is actuated, attracting armature 40 and releasing disc 41 secured to the throttle rod 34. This action slows the motor to idling speed. At 10 seconds after the start of shaft 26 rotation all three cams 22, 23, and 24 limit against a stop pin 47 and stop. This action also stops the rotation of gears 57, 60, and 58 but gear 50 which is actuated by another spring motor continues to move slowly and after a fifteen minute period the cam follower 25A is forced downwardly (as seen in Fig. 2) and contacts 35 are broken, thereby stopping the motor by cutting off the ignition circuit.

It is presumed that the operator will arrive at the car before the 15 minute period has expired. The car engine will then be heated and ready for driving loads. The operator inserts key 15 into the lock switch, turns it, and then opens switches 28 and 33. The car is now conditioned for normal driving.

When the car is again to be conditioned for automatic starting the operator first lifts rod 63, actuating lever 64 and disengaging the lower plate of clutch 61 from its upper plate. This action permits spiral spring 45 to normalize cams 22, 23, and 24, returning them to their start position. After this resetting action and the rewinding of spring 43 the operating procedure as described above is followed and the car is ready for another cycle of automatic starting.

If it is desired to use the above described device as a radio alarm when the operator wishes to rest in his car by sleeping for a predetermined time interval, the device is set in the usual manner and also the radio receiver 21 is turned on and arranged to operate at a volume which is sufficient to wake up the operator. After the predetermined time interval the device will operate as described above and the radio will start because of the circuit which extends from the battery through switch 33, contacts 32, neutral switch 31, and closed contacts 35. For this operation it is unnecessary to close switch 28 to start the car. On some makes of cars the radio sets are wired so that they will operate whether the ignition switch is on or off and in such cases one terminal of the radio receiver must be reconnected to the other side of the switch.

Figure 5:
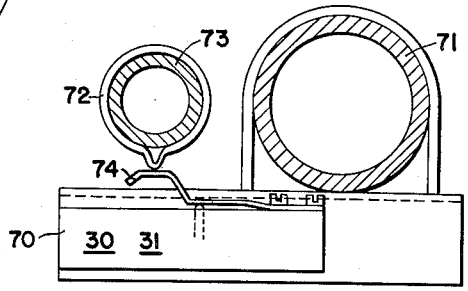
Fig. 5 is a sectional view of a steering post and gear rod showing the neutral switch.

Fig. 5 shows one form of neutral switch which may be used to close contacts 30, 31 when and only when the gear shift is in its neutral position. The switch elements are enclosed in an airtight container 70 and the device is securely clamped to the main steering column 71. A cam 72 is clamped to the gear shift rod 73 so that a switch lever 74 is operated whenever gear rod 73 is in its neutral position as shown.

During the automatic start period when the motor is unattended the car doors will presumably be locked to prevent outside interference but if the doors are open or if the locks are broken the car is still as safe from theft as if the motor were not running. If the gear is moved from the neutral position to drive it away without an ignition key the motor will stop. Even if the neutral switch arrangement is manipulated to keep the motor running the timing mechanism will stop the motor after 15 minutes and after that time only a key in the ignition lock will again start the motor.

While there have been described and illustrated specific embodiments of the invention, it will be obvious that various changes and modifications may be made therein without departing from the field of the invention which should be limited only by the scope of the appended claims.

I claim:

1. An automatic engine starting control device for starting an internal combustion engine which includes a battery, a starter motor, and an electrical ignition system comprising; a presettable mechanical clock mechanism which rotates a primary shaft on which is secured a primary cam arranged to close a switch in series with the ignition system and to start a secondary rotatable shaft coupled to three secondary cams, each of which operates an electrical switch; a first of said secondary cams arranged for closing a switch which connects the battery to the starter motor for rotating the engine crank shaft; a second of said secondary cams for closing a switch in series with the ignition system; a third of said secondary cams for closing a switch in series with the winding of an electromagnet which controls the throttle of the engine; and a friction clutch coupled between a means of rotation and said secondary shaft with manual means of disconnecting the clutch at the end of a starting operation; said primary cam also arranged to open said switch in series with the ignition system to stop the engine after an extended time interval.

2. An automatic engine starting control device for starting an internal combustion engine which includes a battery, a starter motor, and an electrical ignition system comprising; a presettable mechanical clock mechanism which rotates a primary shaft at a uniform speed; a primary cam secured to said shaft arranged to close and open a switch in series with the ignition system and to start a secondary rotatable shaft by disengaging a brake therefrom; said secondary shaft controlled for uniform rotation by an escapement mechanism and coupled through a friction clutch to a means for rotating three secondary cams, each of which operates an electrical switch; a first of said secondary cams arranged for closing a switch which connects the battery to the starter motor for rotating the engine crank shaft; a second of said secondary cams for closing a switch in series with the ignition system; a third of said secondary cams for closing a switch in series with the winding of an electromagnet which controls the throttle of the engine; and a manual means for disconnecting said friction clutch at the end of an engine starting operation.

3. An automatic engine starting control device in accordance with claim 2 in which said secondary cams are resiliently stressed by a spring means to return to their normal starting position; and means for resetting said cams under the action of said spring whenever the friction clutch is disengaged.

4. An automatic engine starting control device in accordance with claim 2 in which a stop pin is mounted in cooperating engagement with the three secondary cams for limiting the cam motion to less than a complete revolution.

5. An automatic engine starting control device in accordance with claim 2 which includes a manually operable switching means for disconnecting the switching contacts associated with all of said secondary cams.

References Cited in the file of this patent

UNITED STATES PATENTS

| | | |
|---|---|---|
| 2,518,712 | Ovens | Aug. 15, 1950 |
| 2,580,820 | Nardone | Jan. 1, 1952 |